United States Patent
Dexter et al.

[15] 3,684,304
[45] Aug. 15, 1972

[54] COMPENSATING-UNIVERSAL CHUCK

[72] Inventors: William R. Dexter, Royal Oak; William R. Jahnke, Rochester; Edward Kimmen, Grosse Pointe Shores, all of Mich.

[73] Assignee: HMS Industries, Inc., Ann Arbor, Mich.

[22] Filed: Feb. 8, 1971

[21] Appl. No.: 113,145

[52] U.S. Cl. ................................. 279/119, 279/1 J
[51] Int. Cl. ..................................... B23b 31/16
[58] Field of Search ................. 279/1 J, 118, 119

[56] References Cited

UNITED STATES PATENTS

| | | | |
|---|---|---|---|
| 3,365,207 | 1/1968 | Crook | 279/119 |
| 2,521,320 | 9/1950 | Ashton | 279/118 |
| 3,266,812 | 8/1966 | Mott et al. | 279/121 |

*Primary Examiner*—Francis S. Husar
*Attorney*—Barnes, Kisselle, Raisch & Choate

[57] ABSTRACT

A chuck with a plurality of jaws for gripping a workpiece which is operable in both the compensating and universal modes. In both modes end faces of workpieces gripped by the jaws are urged into engagement with rest pads to assure that all workpieces are held in the same axially spaced position from a spindle of a machine tool to which the chuck is secured. In the universal mode a center support assembly is axially received between the jaws of the chuck. The support assembly has a center pin which can be releasably locked by a locking member in various positions of axial displacement to assure that the center pin firmly engages in a center hole in the end face of the workpiece. Firm engagement of the center pin with the center hole assures that the workpiece will not be displaced or shifted by the stresses to which it is subjected during heavy cutting operations.

22 Claims, 10 Drawing Figures

INVENTORS
WILLIAM R. DEXTER
WILLIAM R. JAHNKE
BY EDWARD KIMMEN

Barnes, Kisselle, Raisch & Choate
ATTORNEYS

INVENTORS
WILLIAM R. DEXTER
WILLIAM R. JAHNKE
BY EDWARD KIMMEN

Barnes, Kisselle, Raisch, & Choate

ATTORNEYS

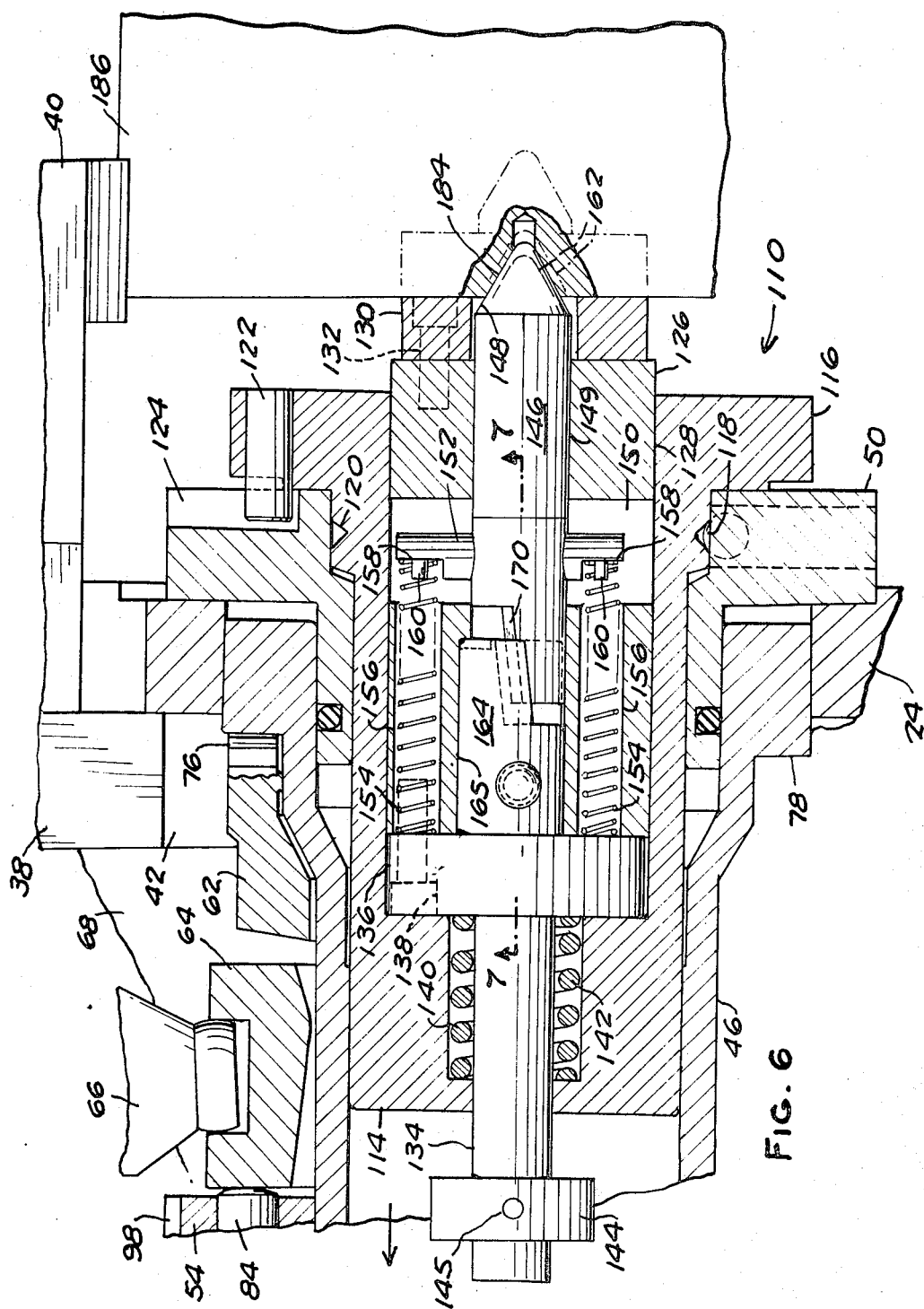

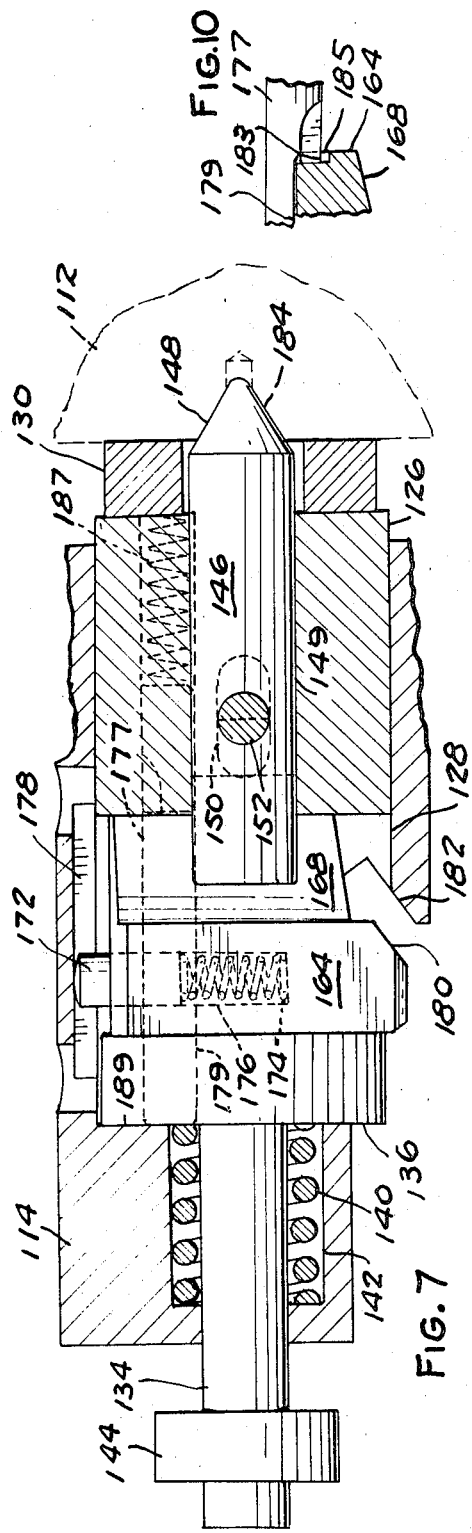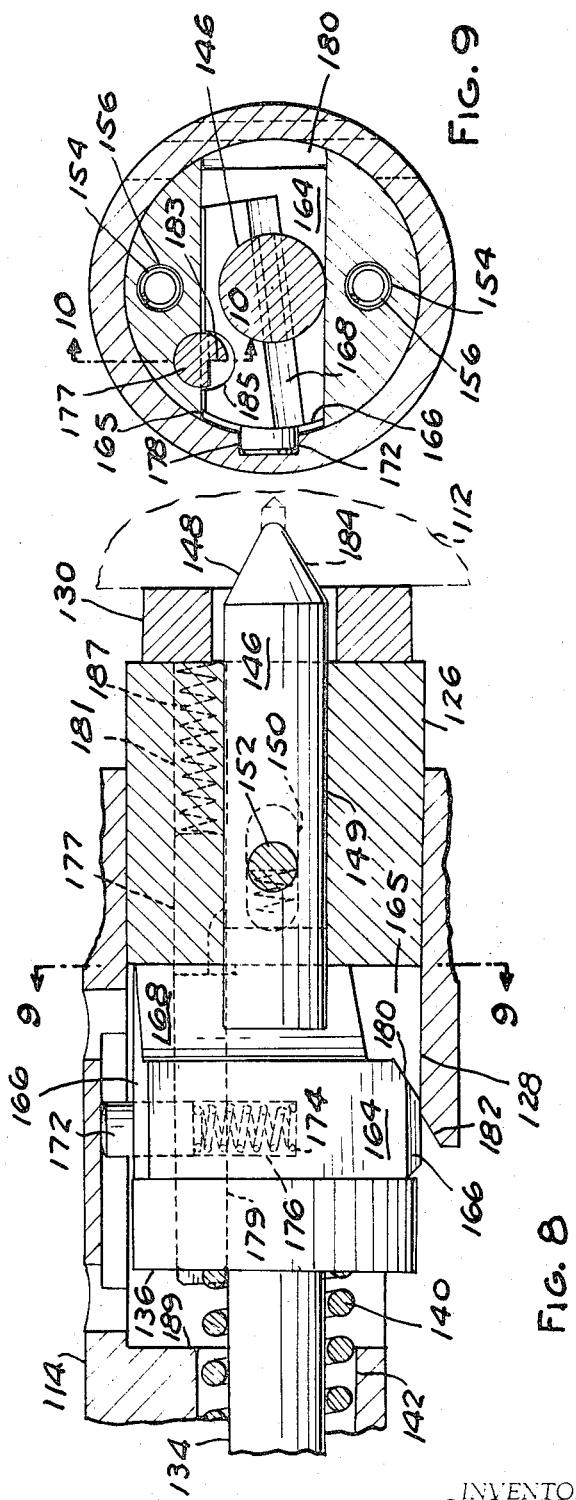

COMPENSATING-UNIVERSAL CHUCK

This invention relates to a power operated chuck for a machine tool such as a lathe and more particularly to a compensating-universal chuck in which all of the jaws advance upon the workpiece in unison in the universal mode of operation and the jaws may advance differentially on and grip a non-uniform workpiece in the compensating mode.

Objects of this invention are to provide a compensating-universal chuck in which workpieces are positively located in a fixed position of axial displacement, in the universal mode there is automatic compensation for variations in the depth of the center hole of the workpiece, either mode of operation can be readily selected by rotating an exposed end of a single shaft without removing the chuck from the machine tool, and is of economical manufacture and assembly and is substantially maintenance free.

These and other objects, features and advantages of this invention will become apparent from the following description and accompanying drawings in which:

FIG. 2 is a fragmentary sectional view on line 4—4 of FIG. 1 showing a wobble ring and adjusting mechanism of the chuck in the compensating mode of operation.

FIG. 6 is an enlarged fragmentary sectional view on line 6—6 of FIG. 1 showing the parts of the center support in the retracted position with a workpiece held by the chuck.

FIG. 7 is a fragmentary sectional view on line 7—7 of FIG. 6 illustrating a wedge lock mechanism with its parts in the position they assume when the carrier and center pin are retracted.

FIG. 8 is a fragmentary sectional view similar to FIG. 7 with the carrier extended.

FIG. 9 is a sectional view on line 9—9 of FIG. 8 with the locking member of the center support in the disengaged position.

FIG. 10 is a sectional view on line 10—10 of FIG. 9 with a latch pin engaged with the locking member.

Figure 1:
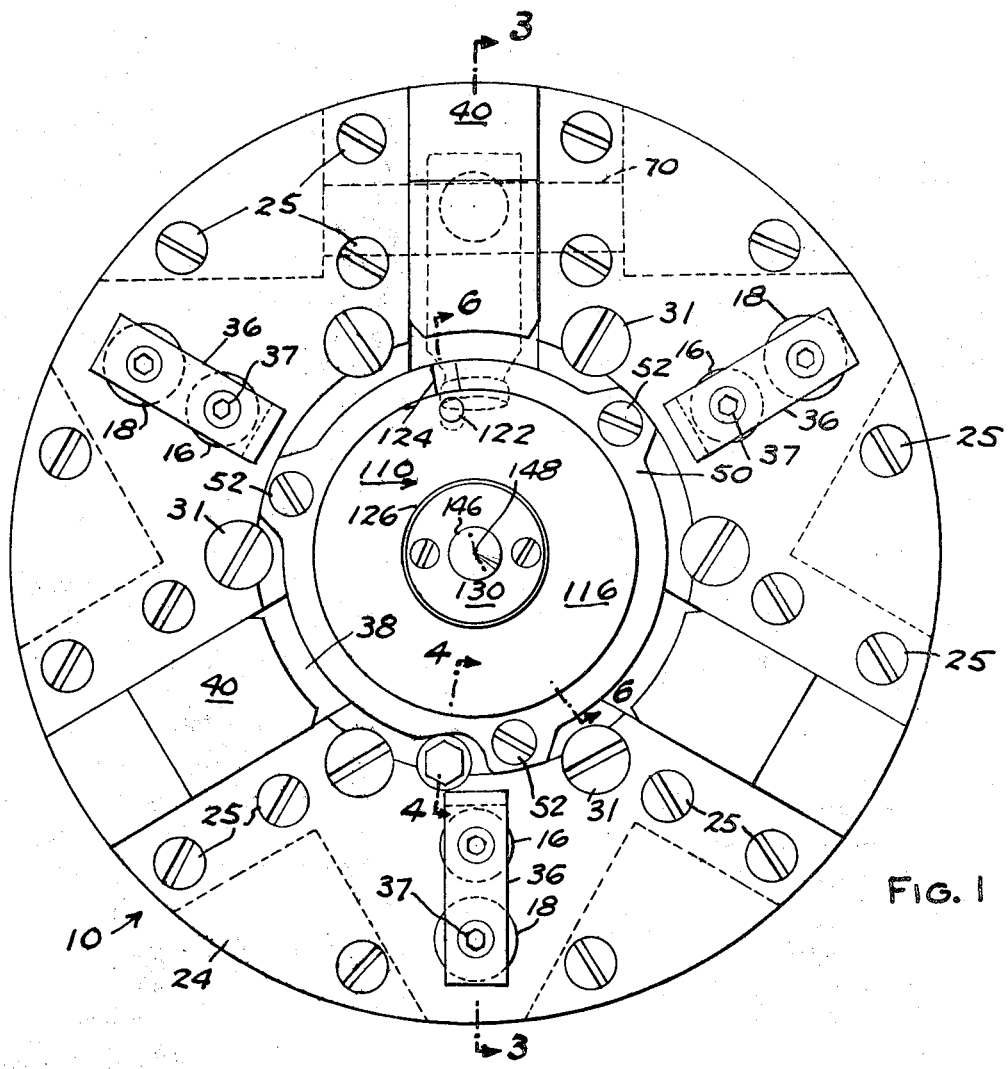
FIG. 1 is a front end view of the compensating-universal chuck of this invention with a removable center support assembly inserted therein.
Figure 2:
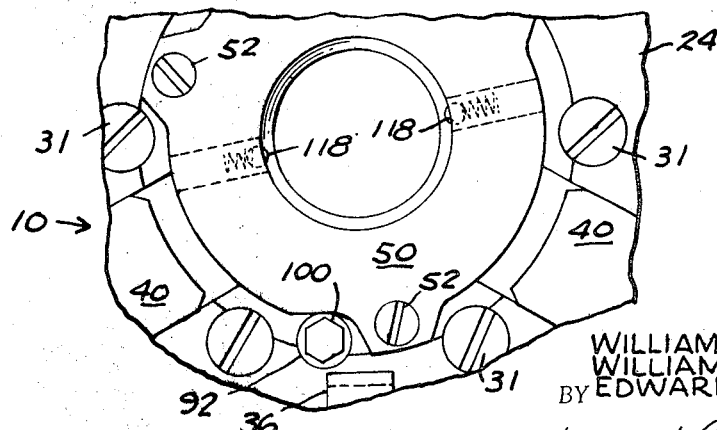
FIG. 2 is a fragmentary front end view similar to FIG. 1 with the center support assembly removed.
Figure 3:
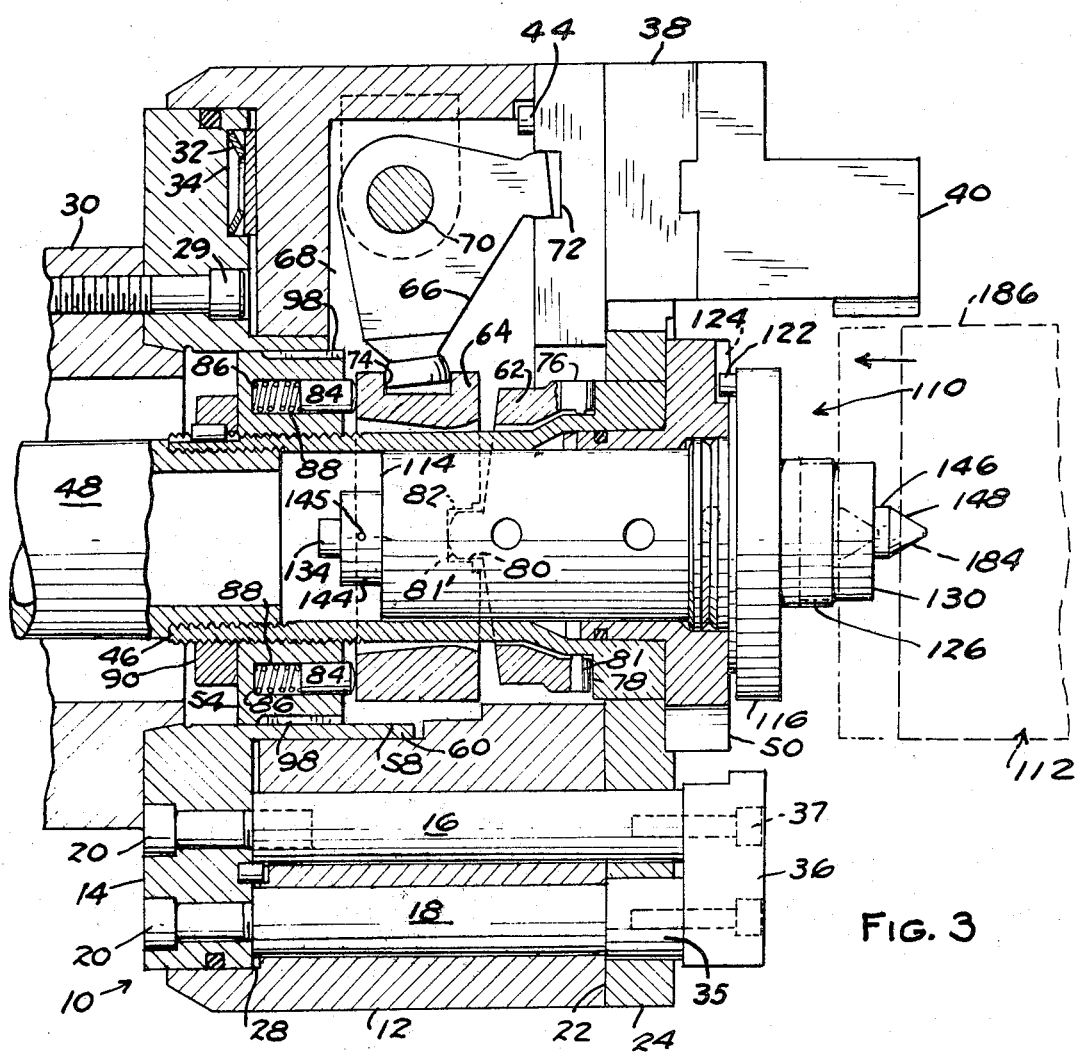
FIG. 3 is a sectional view on line 3—3 of FIG. 1 with the center pin and carrier shown in solid line in the extended position and in phantom line in the retracted position.

Referring to the drawings:

As illustrated in FIGS. 1 and 3, compensating-universal chuck 10 of this invention has a cylindrical body 12 slideably mounted on an adapter or support plate 14 by guide posts 16 and 18 fixed to plate 14 by cap screws 20. Body 12 has an outer face 22 to which a face plate 24 is secured by bolts 25 and an inner face 26 with a recessed large circular opening 28 slideably receiving support plate 14 therein. Support plate 14 is secured by cap screws 29 to a spindle 30 of a machine tool (not shown) for rotation therewith. Cap screws 29 are accessible from the front of chuck 10 through holes in body 12 covered by removable plugs 31 in face plate 24. Body 12 is yieldably extended or urged axially away from plate 14 by a plurality of spring washers 32 each received in a pocket 34 in the outer face of the support plate. Each guide post 18 has a head 35 which retains body 12 on the guide posts. Workpiece rest pads or seats 36 are secured to guide posts 16 and 18 by cap screws 37. Three circumferentially spaced jaw slides 38 with jaws 40 fastened thereto are mounted for generally radial sliding movement in guideways 42 in body 12. A pin 44 is fixed to slide 38 and engages body 12 to limit the radially outward displacement of the slide.

In both the universal and compensating modes of operation slides 38 and jaws 40 are shifted radially by the axial displacement of a draw sleeve 46 threadingly connected to a conventional draw bar or tube 48 of a machine tool. Draw sleeve 46 is mounted for axial sliding movement in chuck 10 by a flanged hub 50 slideably engaging within one end of sleeve 46 and fixed to outer face plate 24 by screws 52, and by a control nut 54 threadingly engaging sleeve 46 adjacent its other end. Control nut 54 has a cylindrical exterior surface 56 which slideably engages within a bore 58 through an integral rim 60 of spindle adapter plate 14. Draw sleeve 46 is linked to jaw slides 38 through equalizing wobble rings 62 and 64 and bell cranks 66. Each bell crank 66 is pivotally mounted in a pocket 68 in body 12 by a pin 70. One end of each bell crank 66 is received in a socket 72 in jaw slide 38 and the other end is received in a socket 74 in wobble ring 64. Wobble ring 62 has a pair of integral opposed bosses 76 on one face thereof bearing on a shoulder 78 of draw tube 46 and a second pair of integral opposed bosses 80 on the other face of ring 62 and at a right angle to the first pair of bosses 76 which are received in a pair of pockets 82 in the outer face of ring 64. Bosses or studs 76 and 80 have semi-circular surfaces 81 and 81' on their free or distal ends and provide pivots or fulcrums about which rings 62 and 64 can rock or cock with respect to each other and the longitudinal axis of draw sleeve 46. Wobble rings 62 and 64 are urged into engagement with each other and shoulder 78 of draw sleeve 46 by a plurality of yieldably biased plungers 84. Each plunger 84 and a partially compressed coil spring 86 are axially received in a blind hole 88 in control nut 54. A jamb nut 90 threadingly engaging draw sleeve 46 limits the extent to which control nut 54 can be retracted or moved away from wobble ring 64 and shoulder 78 of the draw sleeve.

Figure 4:
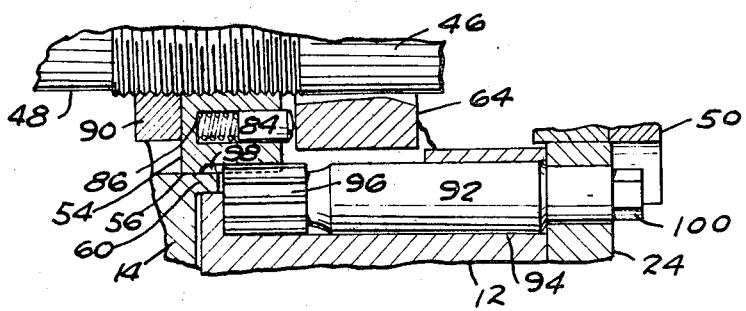
Figure 5:
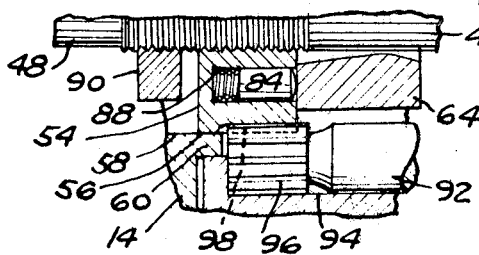
FIG. 5 is a fragmentary sectional view similar to FIG. 4 showing the wobble ring and adjusting mechanism of the chuck in the universal mode of operation.

Chuck 10 can be changed from the compensating mode to the universal mode by rotating control nut 54 so that it is extended or moved axially toward shoulder 78 of draw sleeve 46 from the position shown in FIGS. 3 and 4 to the position of firm engagement with equalizing ring 64 shown in FIG. 5. Moving control nut 54 into firm engagement with ring 64 locks both rings 62 and 64 so that they are no longer free to rock or wobble with respect to each other, thereby causing jaw slides 38 to be shifted radially in unison when draw tube 46 is moved axially. Control nut 54 can be rotated from the exterior of chuck 10 by a pinion 92 axially received in a bore 94 in body 12. Pinion 92 has a set of gear teeth 96 adjacent one end thereof which mesh with a mating set of integral gear teeth 98 in surface 56 of control nut 54. To facilitate rotation of pinion 92 it has an exposed hexagonal head portion 100 on the other end thereof.

When chuck 10 is operated in the compensating mode, a center support assembly 110 is inserted in hub 50 to support a cylindrical workpiece 112 engaged by jaws 40. Center support 110 has a generally cylindrical body 114 with a flange 116 adjacent one end thereof which is axially received in hub 50. Center support 110 is releasably retained in hub 50 by yieldable detent assemblies 118 engaging in a groove 120 in body 114 and is restrained from rotation by a pin 122 fixed to flange 116 and engaging in a groove 124 in hub 50. As shown in FIGS. 6, 7 and 8, a cylindrical center pin carrier 126 is coaxially received in a blind bore 128 in body 114 for sliding movement with respect to body 114. An annular workpiece rest pad 130 is secured by bolts 132 to the exposed end of carrier 126 and a guide plunger 134 with an integral head 136 is secured by cap screws 138 to the other end of carrier 126. Carrier 126 is yieldably urged axially out of body 114 by a coil spring 140 received in a bore 142 in body 114 and bearing on head 136 of plunger 134. The extent to which carrier 126 can extend out of body 114 is limited by a collar 144 connected to plunger 134 by a transverse pin 145.

A center pin 146 with a conical tip 148 is slideably received in a bore 149 in carrier 126. The rotation of pin 146 is prevented and its axial displacement limited with respect to carrier 126 by an elongated transverse opening 150 through the carrier and a transverse stop pin 152 received therein and extending through center 146. Center pin 146 is yieldably urged to extend out of carrier 126 by coil springs 154 received in bores 156 in the carrier and bearing on the head of plunger 134 and flats 158 on stop pin 152. Springs 154 are retained on flats 158 by an alignment pin 160 fixed to stop pin 152. Springs 154 provide less resistance to axially inward displacement of center pin 146 than does spring 140 to axially inward displacement of carrier 126.

As indicated in FIG. 6 by phantom lines 162 there is a range of positions of axial displacement of center pin 146 in which it can be releasably locked by a transversely movable wedge locking member 164. Locking member 164 is slideably received in a slot 165 extending transversely through one end of carrier 126. Locking member 164 has cylindrical sidewall portions 166 which are spaced so that the member can be slideably received within bore 128 of body 114 as shown in FIGS. 8 and 9. Locking member 164 has a flat wedge or cam surface 168 which is engageable with a corresponding flat cam surface 170 on center pin 146 (FIG. 6). Wedge surface 168 and mating center pin surface 170 are inclined with respect to both the longitudinal center line or path of travel of pin 146 and the transverse line or path of travel of locking member 164. The inclination of cam or wedging surfaces 168 and 170 with respect to the line or path of travel of locking member 164 allows the surfaces 168 and 170 to become firmly engaged over a range of positions of axial displacement of pin 146. The inclination of cam surfaces 168 and 170 with respect to the line or path of travel of pin 146 provides the locking action or engagement of the surfaces which prevents pin 146 from being further retracted or axially displaced inward toward locking member 164. Preferably, the included compound angle of inclination of surfaces 168 and 170 with respect to the paths of travel of pin 146 and locking member 164 should be in the range of 6 to 20 degrees and an angle of 12 degrees is highly satisfactory.

Locking member 164 is yieldably urged in the direction of wedging engagement with pin 146 by a plunger 172 and coil spring 174 received in a blind hole 176 in member 164. The rotation of both carrier 126 and locking member 164 with respect to body 114 is prevented by the sliding engagement of plunger 172 in an elongated slot 178 in the sidewall of bore 128 of body 114. A latch pin 177 with a flat portion 179 is slideably received in a bore 181 extending longitudinally through carrier 126 and head 136 of plunger 134. As shown in FIG. 10, latch pin 177 has tang portion 183 which is yieldably urged into a half-moon pocket 185 in locking member 164 by a spring 187. As shown by comparison of FIGS. 7 and 8, as carrier 126 is fully retracted, latch pin 177 bears on end wall 189 of bore 128 and is axially displaced against the bias of spring 187 to disengage tang portion 183 from pocket 185 of locking member 164. This disengagement allows locking member 164 to shift transversely into wedging engagement with center pin 146. As carrier 126 is extended or moves axially outward with respect to body 114, locking member 164 is shifted transversely to disengage and release pin 146 by the cooperation of a cam surface 180 on member 164 and with an inclined abutment surface 182 on body 114.

To operate chuck 10 in the compensating mode center support assembly 110 is inserted in hub 50 of the chuck and pinion 92 is rotated to shift control nut 54 into engagement with jamb nut 90 thereby releasing wobble rings 62 and 64 so that they are free to rock with respect to sleeve 46. Workpiece 112 with a conical center hole 184 is positioned on center pin 146 and moved axially toward the chuck so that its end face firmly engages rest pad 130 thereby displacing pin 146 with respect to carrier 126 and moving carrier 126 against the bias of spring 140 into the bottomed position in bore 128 of body 114 (as shown in FIGS. 6 and 7). As carrier 126 bottoms in bore 128, latch pin 177 is axially shifted to disengage its tang portion 183 from pocket 185 in locking member 164, thereby releasing the locking member. Releasing locking member 164 allows spring biased plunger 172 to shift the locking member transversely so that its wedge surface 168 snaps into wedging engagement with surface 170 of center pin 146, thereby firmly locking pin 146 so that it cannot be further axially inwardly displaced with respect to carrier 126. As shown in FIG. 6, pin 146 can be locked in firm engagement with center hole 184 of workpiece 112 by locking member 164 even though the depth of conical center hole 184 varies between the range defined by phantom lines 162. Draw bar 48 of the machine tool (not shown) is actuated to retract or shift draw sleeve 46 axially inwardly or to the left from the position shown in FIG. 3 to that shown in FIG. 6. Retracting draw sleeve 46 moves jaw slides 38 radially inward and shifts jaws 40 into firm gripping engagement with the outer surface 186 of workpiece 112 as shown in FIG. 6. If the points at which jaws 40 contact surface 186 of the workpiece are not all equal distant from the axial center line of center pin 146, wobble rings 62 and 64 will rock or cock with respect to sleeve 46 so that all three jaws 40 apply an equal clamping force to workpiece 112. Actuating draw bar 48 to retract draw sleeve 46 also moves body 12 against the bias of springs 32 into firm engagement with adapter plate 14. In the compensating mode, each workpiece 112 held by chuck 10 is brought into firm engagement with workpiece rest pad 130, carrier 126 to which pad 130 is secured is bottomed in bore 128 of center support body 114, and body 12 of chuck 10 firmly engages adapter plate 14. Thus the end face of each workpiece 112 always assumes the same position of axial displacement or axial spacing with respect to spindle 30 of the machine tool regardless of the depth of its conical center hole 184.

To release workpiece 112 from chuck 10 draw bar 48 of the machine tool is actuated to extend draw sleeve 46 from the position shown in FIG. 6 to that shown in FIG. 3. Extending draw sleeve 46 shifts slides 38 and jaws 40 radially outward so that the jaws disengage from workpiece 112. Workpiece 112 is then shifted to the right and removed from engagement with rest pad 130 and center pin 146. Disengagement of workpiece 112 from rest pad 130 allows spring 140 to extend carrier 126. Extending carrier 126 causes cam surface 180 and abutment surface 182 to engage and move locking member 164 transversely against the bias of spring 174 and plunger 172 from the position shown in FIG. 7 to that shown in FIG. 8. This movement of locking member 164 allows the tang portion 183 of latch pin 177 to engage in pocket 185 of the locking member to retain the locking member in the disengaged position. This movement of locking member 164 disengages its wedge surface 168 from cam surface 170 of center pin 146 thereby releasing or unlocking the center pin. This releasing of center pin 146 allows the center pin to be axially extended or shifted to the right by springs 154 as workpiece 112 is disengaged from the center pin.

To operate chuck 10 in the universal mode, center assembly 110 is removed from hub 50 and pinion 92 is rotated to move control nut 54 from the position shown in FIG. 4 to that shown in FIG. 5 so that it is in firm engagement with wobble ring 64 and urges wobble ring 62 into firm engagement with shoulder 78 of draw sleeve 46. This movement of control nut 54 locks out or prevents wobble rings 62 and 64 from rocking or cocking with respect to draw sleeve 46. Thus axial movement of sleeve 46 will through bell cranks 66 move jaw slides 38 and jaws 40 radially in unison so that in the universal mode jaws 40 are always equal distant from the axial center line of chuck 10. A workpiece similar to workpiece 112 is inserted between jaws 40 with its end face resting on work stops 36. Draw bar 48 of the machine tool is actuated to retract draw sleeve 46 which shifts jaws 40 radially inwardly to grip the workpiece. Retracting of draw sleeve 46 also moves body 12 axially to the left to urge the end face of the workpiece into firm engagement with the stops 36 thereby compensating for any tendency of the workpiece to be moved away from stops 36 by the engagement of jaws 40 with the workpiece. Thus when operated in the universal mode chuck 10 positions each workpiece so that its end face always assumes the same position and is spaced the same axial distance from the spindle 30 of the machine tool. In the universal mode the workpiece is released from chuck 10 by extending draw bar 48 of the machine tool to move draw sleeve 46 to the right. This movement of draw sleeve 46 shifts slides 38 and jaws 40 radially outward and disengages the jaws from the workpiece so that it can be removed from chuck 10.

The use of a center pin which is automatically locked in engagement with workpiece center holes of various depths with the end face of a workpiece resting firmly on a positive stop provides a compensating chuck in which the workpiece can be securely held and will not be displaced by the stresses and forces to which it is subjected during a heavy machining or cutting operation. This chuck also provides a way of assuring in both modes of operation that the workpieces will assume the same spacing from the spindle of the machine tool on which the chuck is used. The pinion and threaded control nut arrangement provides a readily accessible way of changing the mode of operation of the chuck without removing the chuck from the machine tool and the wobble rings associated with the draw sleeve and control nut provide a sensitive means for equalizing the force applied by the jaws to a workpiece in the compensating mode of operation.

What is claimed as new is as follows:

1. A chuck for gripping a workpiece comprising; a chuck body adapted for rotation on an axis thereof, a plurality of jaw slides carried by said chuck body for generally radial sliding movement with respect to said axis, a draw sleeve mounted for generally axial movement in said body, equalizing means operably connected with said draw sleeve and said jaw slides such that said slides can move radially non-uniformly in response to axial movement of said draw sleeve and will apply a substantially equal gripping force to a workpiece through each of said jaw slides, a center support body received by said chuck body between said jaw slides, a center pin generally coaxial with said chuck axis and mounted in said support body for axial movement with respect thereto, biasing means yieldably urging said center pin axially outward with respect to said chuck body, at least one rest pad adapted to engage an end face of a workpiece and mounted to assume a fixed axial position with respect to said chuck body, and locking means carried by said support body and releasably engageable in a first position with said center pin to prevent further axial displacement of said center pin away from a workpiece engaging said center pin when an end face of the workpiece firmly engages said rest pad in the fixed axial position with respect to said chuck body and in a second position releases said center pin to be moved by its biasing means when the workpiece disengages from said rest pad and said center pin.

2. The chuck of claim 1 in which said rest pad is mounted for generally axial movement in said support body and which also comprises biasing means yieldably urging said rest pad generally axially outward of said support body.

3. The chuck of claim 1 which also comprises control means carried by said sleeve and movable from a first position wherein said equalizing means is operable to a second position locking out said equalizing means such that said jaw slides are moved radially in unison by axial movement of said draw sleeve.

4. The chuck of claim 2 which also comprises control means carried by said sleeve and movable from a first position wherein said equalizing means is operable to a second position locking out said equalizing means such that said jaw slides are moved radially in unison by axial movement of said draw sleeve.

5. The chuck of claim 3 which also comprises operator means mounted in said chuck body, accessible for manipulation from the exterior of said chuck body, and connected to said control means for moving said control means to said first and second positions.

6. The chuck of claim 4 which also comprises operator means mounted in said chuck body, accessible for manipulation from the exterior of said chuck body, and connected to said control means for moving said control means to said first and second positions.

7. The chuck of claim 3 in which said equalizing means comprises first and second wobble rings carried by said draw bar, said rings being pivotally mounted with respect to each other and one of said rings being pivotally mounted with respect to said sleeve such that said rings can rock with respect to each other and said draw bar, and said control means comprising a nut threadingly engaging said draw bar and movable to a first position wherein said rings are free to rock and to a second position to lock said rings from pivotal movement with respect to each other and said sleeve.

8. The chuck of claim 4 in which said equalizing means comprises first and second wobble rings carried by said draw bar, said rings being pivotally mounted with respect to each other and one of said rings being pivotally mounted with respect to said sleeve such that said rings can rock with respect to each other and said draw bar, and said control means comprising a nut threadingly engaging said draw bar and movable to a first position wherein said rings are free to rock and to a second position to lock said rings from pivotal movement with respect to each other and said sleeve.

9. The chuck of claim 7 which also comprises a set of gear teeth carried by said nut and a pinion engageable with said gear teeth, said pinion mounted for rotation in said body and accessible for manipulation from the exterior thereof such that rotation of said pinion will threadingly move said nut to said first and second positions.

10. The chuck of claim 1 which also comprises an adapter plate arranged closely adjacent an inner face of said chuck body and generally perpendicular to said axis, guide posts each secured to said adapter plate and extending through said chuck body and mounting said body for generally axial movement with respect to said adapter plate with their free ends adjacent an outer face of said body generally opposite to said inner face, workpiece rest pads secured to said free ends of said guide posts and located outwardly of said outer face, and biasing means yieldably urging said chuck body generally axially away from said adapter plate.

11. A chuck for gripping a workpiece comprising; a chuck body adapted for rotation on an axis thereof, a plurality of jaw slides carried by said chuck body for generally radial sliding movement with respect to said axis, a draw sleeve mounted in said body for generally axial movement, and equalizing means operably connected to said draw sleeve and said jaw slides comprising first and second juxtaposed wobble rings generally coaxial with and carried by said sleeve, said rings being pivotally mounted with respect to each other and at least one of said rings being pivotally mounted with respect to said draw sleeve such that both of said rings can rock with respect to said draw sleeve and said chuck body such that said jaw slides can move radially non-uniformly in response to axial movement of said draw sleeve and will apply a substantially equal force through each of said jaw slides to a workpiece.

12. The chuck of claim 11 which also comprises a control nut threadingly connected to said draw sleeve and movable to a first position wherein said rings are free to rock and to a second position to lock said rings from pivotal movement with respect to each other and said draw sleeve such that said jaw slides move radially in unison in response to axial movement of said draw sleeve.

13. The chuck of claim 12 which also comprises a pinion operably connected to said control nut and accessible from the exterior of said body such that manipulation of said pinion threadingly moves said control nut to said first and second positions.

14. The chuck of claim 11 which also comprises an adapter plate generally parallel to and adjacent an inner face of said chuck body, guide posts secured to said adapter plate and each extending through said chuck body and mounting said body for generally axial movement with respect to said adapter plate with their free ends adjacent an outer face of said chuck body, workpiece rest pads secured to the free ends of said guide posts and located outwardly of said outer face, and biasing means yieldably urging said body generally axially away from said adapter plate.

15. The chuck of claim 12 which also comprises an adapter plate generally parallel to and adjacent an inner face of said chuck body, guide posts secured to said adapter plate and each extending through said chuck body and mounting said body for generally axial movement with respect to said adapter plate with their free ends adjacent an outer face of said chuck body, workpiece rest pads secured to the free ends of said guide posts and located outwardly of said outer face, and biasing means yieldably urging said body generally axially away from said adapter plate.

16. A chuck for gripping a workpiece comprising; a chuck body adapted for rotation on an axis thereof, a plurality of jaw slides carried by said chuck body for generally radial sliding movement with respect to said axis, a draw sleeve mounted in said body for generally axial movement, equalizing means operably connected with said draw sleeve and said jaw slides such that said slides can move radially non-uniformly in response to axial movement of said draw sleeve and will apply a substantially equal gripping force through each of said jaw slides to a workpiece, a workpiece support body removably received in said chuck body between said jaw slides, at least one rest pad adapted to bear on an end face of a workpiece and to assume a fixed axial position with respect to said chuck body, a center pin coaxial with said axis and mounted for axial movement in said support body, biasing means yieldably urging said center pin axially away from said support body, and a locking member carried by said support body and movable to a first position engaging said center pin and locking it from further axial inward movement in response to firm engagement of an end face of a workpiece with both said center pin and said rest pad in said fixed axial position and to a second position releasing said center pin in response to disengagement of the workpiece with said rest pad.

17. The chuck of claim 16 in which said rest pad is carried by said support body for generally axial movement with respect thereto and also comprising biasing means yieldably urging said rest pad axially away from said support body.

18. The chuck of claim 16 which also comprises an adapter plate generally parallel to and adjacent an inner face of said chuck body, guide posts secured to said adapter plate and each extending through said chuck body and mounting said body for generally axial movement with respect to said adapter plate with their free ends adjacent an outer face of said chuck body, workpiece rest pads secured to the free ends of said guide posts and located outwardly of said outer face, and biasing means yieldably urging said body generally axially away from said adapter plate.

19. The chuck of claim 17 which also comprises an adapter plate generally parallel to and adjacent an inner face of said chuck body, guide posts secured to said adapter plate and each extending through said chuck body and mounting said body for generally axial movement with respect to said adapter plate with their free ends adjacent an outer face of said chuck body, workpiece rest pads secured to the free ends of said guide posts and located outwardly of said outer face, and biasing means yieldably urging said body generally axially away from said adapter plate.

20. The chuck of claim 16 which also comprises a carrier body mounted for generally axial movement in said support body, said rest pad being secured to said carrier body, said center pin being mounted for axial movement in said carrier body, biasing means yieldably urging said carrier body generally axially away from said support body, stop means limiting the movement of said carrier body into said support body, a locking member mounted in said carrier body for movement generally transverse to said axis, said locking member and said center pin each having a mating flat cam surface with said cam surfaces being inclined with respect to both the line of transverse movement of said locking member and the line of axial movement of said center pin, and means moving said locking member to engage said cam surfaces and lock said center pin against further axially inward movement in response to the end face of a workpiece firmly engaging said rest pad and moving said carrier body into firm engagement with said stop means and disengaging said cam surfaces in response to disengagement of the workpiece with said rest pad.

21. A chuck for gripping a workpiece comprising; a chuck body adapted for rotation on an axis thereof, a plurality of jaw slides carried by said chuck body for generally radial reciprocal movement with respect to said axis, a draw sleeve mounted in said body for generally axial movement, equalizing means operably connected with said draw sleeve and said jaw slides such that said slides can move radially non-uniformly in response to axial movement of said draw sleeve and will apply a substantially equal gripping force through each of said jaw slides to a workpiece, an adapter plate generally parallel with and adjacent an inner face of said chuck body, guide posts each fixed to said support plate and extending through said chuck body and mounting said body for generally axial movement with respect to said adapter plate with their free ends adjacent an outer face of said chuck body, and workpiece rest pads secured to said free ends of said guide posts and located outwardly of said outer face.

22. A chuck operable in the compensating mode and a workpiece center support adapted to be received therein comprising; a support body adapted to be generally axially received in a chuck body, a carrier body mounted for generally axial movement in said support body, biasing means yieldably urging said carrier body axially out of said support body, stop means positively limiting the movement of said carrier body axially into said support body, a rest pad adapted to engage an end face of a workpiece, said rest pad fixed to said carrier body for axial movement therewith, a center pin mounted for axial movement in said carrier body with one end extending axially outwardly beyond said rest pad, biasing means yieldably urging said center pin axially outward of said carrier body, a locking member mounted in said carrier body for sliding movement generally transverse to said axial movement of said center pin, a flat cam surface on said locking member and a mating flat cam surface on said center pin with both of said cam surfaces being inclined with respect to the lines of motion of said locking member and said center pin, and means moving said locking member to a first position to engage said cam surfaces to prevent further inward movement of said center pin with respect to said carrier body in response to the end face of a workpiece firmly engaging both said center pin and said rest pad and moving said carrier body into engagement with said positive stops and to a second unlocked position disengaging said cam surfaces in response to the workpiece disengaging from said rest pad and said carrier body moving outwardly.

* * * * *

PO-1050
(5/69)

UNITED STATES PATENT OFFICE
CERTIFICATE OF CORRECTION

Patent No. 3,684,304      Dated August 15, 1972

Inventor(s) William R. Dexter, William R. Jahnke, Edward Kimmen

It is certified that error appears in the above-identified patent and that said Letters Patent are hereby corrected as shown below:

Please change the name of the assignee corporation from

"HMS Industries, Inc." to -- KMS Industries, Inc. --

Signed and sealed this 19th day of December 1972.

(SEAL)
Attest:

EDWARD M. FLETCHER, JR.          ROBERT GOTTSCHALK
Attesting Officer                 Commissioner of Patents